US005763777A

United States Patent [19]
Grim et al.

[11] Patent Number: 5,763,777
[45] Date of Patent: Jun. 9, 1998

[54] CONICAL TOOL HOLDER FOR PRECISION BALANCER

[75] Inventors: Gary K. Grim; Bruce J. Mitchell, Jr., both of Ann Arbor, Mich.

[73] Assignee: Balance Technology, Inc., Ann Arbor, Mich.

[21] Appl. No.: 691,498

[22] Filed: Aug. 2, 1996

[51] Int. Cl.$^6$ .................. G01M 1/00; B23B 5/00
[52] U.S. Cl. .................. 73/460; 73/471; 72/67; 72/80; 82/903
[58] Field of Search .................. 73/462, 471, 474, 73/484, 460; 82/903; 72/80, 67

*Primary Examiner*—Hezron E. Williams
*Assistant Examiner*—Richard A. Moller
*Attorney, Agent, or Firm*—Miller, Canfield, Paddock and Stone, PLC

[57] ABSTRACT

A machine for determining dynamically a residual unbalance in a workpiece having a conical surface is provided with a plurality of support elements, such as roller elements, that communicate with the workpiece at the conical surface thereof. The roller elements are arranged circumferentially equidistant about the workpiece and may have cylindrical or conical configurations. Further support elements, such as roller elements, can be applied against an annular surface of the workpiece, such as on a flange portion thereof. At least one of the support rollers that communicates with the conical surface is arranged to rotate about an adjustable axis of rotation that can be oriented with respect to the workpiece to achieve good rotative communication therebetween. The rollers are arranged to rotate at different speeds from the workpiece, whereby an unbalance signal associated with the workpiece can readily be isolated from a composite signal having unbalance information related to a residual unbalance of the workpiece combined with residual unbalances of the rollers.

5 Claims, 7 Drawing Sheets

CONICAL TOOL HOLDER FOR PRECISION BALANCER

BACKGROUND OF THE INVENTION

1. Field of the Invention

This invention relates generally to balancing arrangements, and more particularly, to a holder arrangement for supporting an article to be subjected to a balancing procedure.

2. Description of the Related Art

Tool holders of the type that are generally used in balancing equipment are of standard sizes, illustratively CAT T-30, T-35, T-40, and T-50. Conventional balancing arrangements of reasonable costs generally conform to the standards of ISO balance grade G-2.5. However, since the spindle speeds of machining equipment have steadily increased, there is a need to achieve balance to ISO G-1.0. Conventional balancing arrangements generally are unable to achieve the higher levels of balancing accuracy required by the ISO G-1.0 standard, partly as a result of the conical configuration of the mounting surface of the tool holder. In some known tooling arrangements, the included angle of the mounting surface of the tool holder has a slope of 3.5 inches per 12 inches. In order to balance to ISO G-1.0 standards, the tool holder must spin true to its conical surface and the mass center must be adjusted to within 10 micro-inches of the spinning access.

In known arrangements, tool holders are balanced by placing same into a mating conical hole in an adapter. Alternatively, the tool holder is placed directly in the shaft of the spindle, occasionally with a drawbar mechanism to set the taper tightly. When the tool holder is operated with its axis of rotation oriented vertically, the tool holder is dropped a short distance, so as to seat the taper. Gravity is sufficient to insure that the tool holder does not rise up. However, it is a problem with this known arrangement that the cost of a precision spindle, limits to the accuracy of centering the tool holder resulting from mismatch with the conical surface, and interference signals resulting from the additional suspended and spinning weight significantly limit the precision of the balance that is achieved.

It is, therefore, an object of this invention to provide an arrangement for supporting rotatively a workpiece having a conical surface. It is another object of this invention to provide an arrangement that supports a conical workpiece rotatively without chattering or binding.

It is also an object of this invention to provide an arrangement for supporting rotatively a conical workpiece wherein all points of contact with the workpiece have the same surface velocity.

It is a further object of this invention to provide an arrangement for supporting rotatively a workpiece to be balanced, having a conical surface wherein contribution to an unbalance signal by the supporting structure can easily be identified and separated from the unbalance signal component associated with the workpiece.

It is additionally an object of this invention to provide an arrangement for supporting a conical workpiece that facilitates measurement of static and dynamic unbalance of the workpiece.

It is yet a further object of this invention to provide an arrangement for supporting rotatively a workpiece having a conical surface wherein the workpiece can readily be driven to rotate at a balancing speed.

It is also another object of this invention to provide an arrangement for supporting rotatively a workpiece having a conical surface, the arrangement employing a non-rotating support element.

It is yet another object of this invention to provide an arrangement for supporting rotatively a workpiece having a conical surface for centering same, in combination with a second surface of the workpiece, which may be a substantially perpendicular flange face, for squaring the workpiece.

SUMMARY OF THE INVENTION

The foregoing and other objects are achieved by this invention which provides an apparatus for determining the location and magnitude of residual unbalance of a workpiece having an engagement portion of the type characterized by a substantially conical surface. The substantially conical surface defines a predetermined included characteristic angle with respect to an axis of rotation of the workpiece. In accordance with the invention, a support arrangement is provided having a plurality of rotatory support elements that support the workpiece rotatively. Each of the rotatory support elements has a respectively associated rotatory element axis of rotation, the axis of rotation of the rotatory support elements being arranged to intersect one another. Each of the rotatory support elements is arranged to communicate with the substantially conical surface of the engagement portion of the workpiece and rotates at a different rate of rotation than a rate of rotation of the workpiece. A transducer produces a multicomponent unbalance signal responsive to the residual unbalance of the workpiece and a residual unbalance of the workpiece support arrangement. The transducer operates in combination with a system, which may include a detector, for determining a reference position of the workpiece.

In accordance with a specific illustratively embodiment of the invention, there is provided an adjustment arrangement for enhancing the communication between the support arrangement and the workpiece. Preferably, the adjustment is achieved by reorienting a selected one of the axes of rotation of the rotatory elements. In most situations, the conical surface of the workpiece is an external surface, such as that of a conventional tooling used to hold a workpiece in a machining arrangement. The present invention, however, can be applied to workpieces having internal conical surfaces.

In accordance with a further aspect of the invention, there is provided an arrangement for supporting an item during rotation, the item having a conical surface. A plurality of rotatory elements are arranged to rotate about respective axes of rotation, the rotatory elements each having an external rotatory element surface for communicating with the conical surface of the item. Additionally, there is provided an adjustment arrangement for facilitating adjustment of an orientation of the respective axes of rotation to effect a predetermined communication between the plurality of rotatory elements and the item.

In one embodiment of this further aspect of the invention, the conical surface of the item is an external surface. In other embodiments, the conical surface is an internal conical surface, whereby the rotatory elements are arranged to communicate on their outermost perimeters with the internal conical surface of the item being rotated.

There is provided in a further embodiment of the invention an adjustment arrangement for ensuring that the plurality of rotatory elements communicates without slippage or chattering with the conical surface of the item during rotation. In a preferred embodiment, each of the rotatory elements has a diameter that is unequal to a corresponding diameter of the item in a region where the plurality of rotatory elements communicate with a conical surface of the item. In this manner, the rotatory elements rotate at a speed of rotation that is different from that of the workpiece, and accordingly, signals relating to unbalance of the rotatory elements can easily be filtered out from the composite signal, thereby isolating the unbalance component associated with the workpiece. In one embodiment, the rotatory elements each have a substantially cylindrical configuration. However, in other embodiments, the rotatory elements have a substantially conical configuration.

Preferably, at least one of the rotatory elements is coupled to a drive arrangement, such as a motor, illustratively by a drive belt. The driven rotatory element imparts by surface communication a circumferential force to the workpiece, whereby it is caused to rotate at a predetermined balancing speed.

In accordance with a method aspect of the invention, a method of rotating a conical part about an axis of rotation thereof comprises the steps of:

supporting the conical part on a plurality of rotatory elements each arranged to rotate about a respective axis of rotation; and driving rotatively at least one of the plurality of rotatory elements at a rate of rotation that is different from a rate of rotation of the conical part about its axis of rotation.

In one embodiment of this method aspect of the invention, there is provided the step of adjusting an orientation of an axis of rotation of a rotatory element with respect to the axis of rotation of the conical part to enhance a rotatory communication between the conical part and the plurality of rotatory elements. As previously described, the rotatory elements can have cylindrical or conical configurations.

In one particularly advantageous embodiment of the invention, the axes of rotation of the rotatory elements are arranged to intersect one another, and also preferably to intersect the axis of rotation of the substantially conical part.

In accordance with a machine aspect of the invention, a dynamic balancing machine supports a workpiece having a conical mounting surface. An unbalance measuring arrangement produces an electrical measurement signal responsive to an unbalance in the workpiece. A support arrangement supports the workpiece rotatively, and a drive element rotates the workpiece at a predetermined balancing speed.

In one embodiment, the support arrangement includes a plurality of roller support elements arranged to communicate with the conical mounting surface of the workpiece. In a still further embodiment, the plurality of roller elements are arranged circumferentially equidistant around the workpiece, and in a preferred embodiment, three such roller elements are arranged 120° apart from one another. In addition, the plurality of rollers support elements are arranged axially equidistant with respect to a central axis of the workpiece, so as to communicate with the conical mounting surface of the workpiece at a first axial location there along.

In a particularly advantageous embodiment of the invention, there is provided a further plurality of roller support elements arranged axially equidistant with respect to a central axis of the workpiece, so as to communicate with the conical mounting surface of the workpiece at a second axially location there along. Although not required, each of the further plurality of roller support elements is arranged coaxially with the correspondingly associated one of the plurality of roller support elements. Since the further plurality of roller support elements communicates with the workpiece at a different axial location, where the effective diameter of the conical surface of the workpiece is different from that of the region where the first plurality of roller support elements communicates therewith, the further plurality of roller support elements are rotated at different speeds from the original plurality of roller support elements, and from the workpiece. Thus, the frequency of an unbalance signal associated with the residual unbalance in the workpiece can be isolated from the frequencies of the unbalance signals associated with the plurality of roller support elements and the further plurality of roller support elements.

In a further embodiment of the invention, there is provided a detector arrangement in the vicinity of the workpiece for detecting a reference position thereon. Preferably, the detector includes a photo electric detector that detects a rotative reference position on the workpiece. A processor receives the output of the detector and produces a speed signal responsive to the rate of rotation of the workpiece and an unbalance location signal responsive to a location of a residual unbalance of the workpiece with respect to the reference position. The information content of the speed and unbalance location signals may, in certain embodiments, be displayed so as to be comprehensible to an operator.

In a further embodiment of the invention, there is a provided a force detector, which may be in the form of a piezoelectric element fixed in the vicinity of the workpiece for measuring an unbalance force in a plane that is transverse to the axis of rotation of the workpiece. In a further embodiment, there is provided a further force detector, in the form of a further piezoelectric element fixed in the vicinity of the workpiece for measuring an unbalance force in a further plane transverse to the rotation of the workpiece.

In a preferred embodiment of the invention, the workpiece is an ISO standard tooling for a machining system, wherein the conical mounting surface is used to center the ISO standard tooling in the machining system. With respect to the tooling support arrangement, the roller support elements may have conical, cylindrical, or other suitable configurations. Additionally, non-rotating guide pad elements may be arranged to communicate with the conical mounting surface of the workpiece.

BRIEF DESCRIPTION OF THE DRAWING

Comprehension of the invention is facilitated by reading the following detailed description, in conjunction with the annexed drawing, in which.

DETAILED DESCRIPTION

Figure 1:
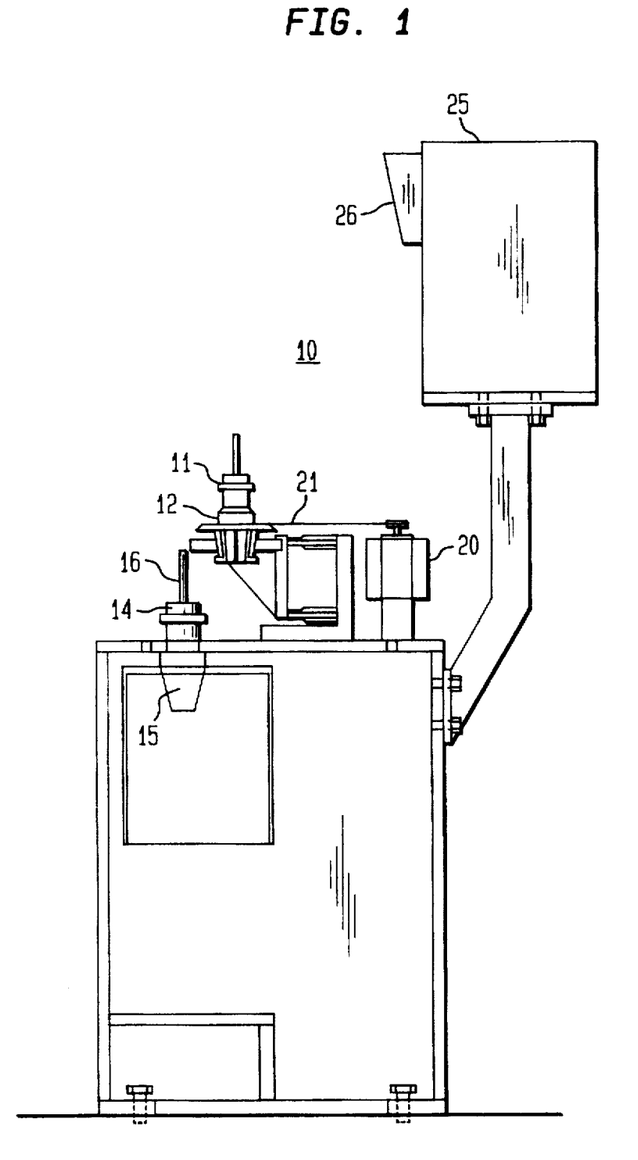
FIG. 1 is a plan representation of a balancing machine constructed in accordance with the invention.

FIG. 1 is a plan view of a balancing machine 10 showing a workpiece 11 installed on a roller support arrangement 12, the details of which will be described below. Workpiece 11 is, in this specific illustrative embodiment of the invention, a conventional tool holder having a conical support surface. A further workpiece 14 is shown in a standby position of balancing machine 10. Further workpiece 14 is identical to workpiece 11, and is shown to have a conical surface 15 and a tool 16 installed thereon. Thus, balancing machine 10 will determine the magnitude and location of a residual unbalance in the workpiece with the tool installed therein.

Roller support arrangement 12 is driven rotatively by a motor 20 that is coupled thereto by a drive belt 21.

Balancing machine 10 is additionally provided with a photo electric detector (not shown) that detects a reference mark (not shown) on workpiece 11 whereby an electrical speed signal is produced that is responsive to the rate of rotation of the workpiece. The balancing machine is further provided with one or more piezoelectric (not shown) detectors that produce signals responsive to the unbalance forces that are produced in response to the residual unbalances in the workpiece and in the roller support arrangement. The speed signal and the composite unbalance signal are conducted to a processor 25 which, in this embodiment, is shown to have a display 26.

In one embodiment of the invention, the composite signal representing the unbalance forces in the workpiece in the roller support arrangement is processed to isolate the unbalance signal component associated with the workpiece. The magnitude of the unbalance of the workpiece, as well as the location of the unbalance with respect to the reference mark (not shown) of the workpiece is represented in display 26.

Figure 2:
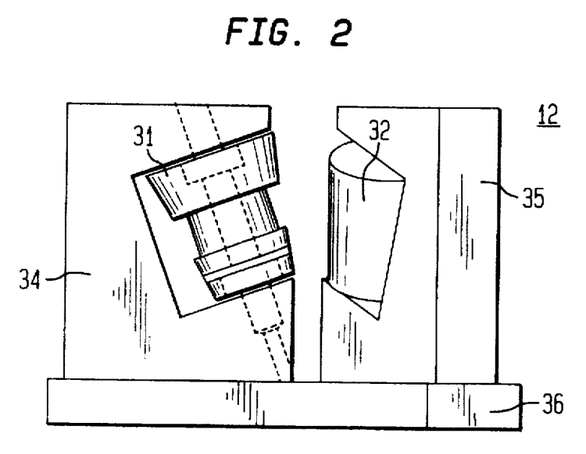
FIG. 2 is a partly phantom representation of a roller support arrangement for supporting a conical workpiece in accordance with the invention.

FIG. 2 is a partially phantom representation of a specific illustrative embodiment of a support roller arrangement 12 according to the invention. As shown, the support roller arrangement is provided with a plurality of support rollers 31 and 32 which are supported on respective roller supports 34 and 35. The roller supports are themselves installed, in this embodiment, on a base 36 that maintains the roller supports in fixed relation to one another.

Figure 3:
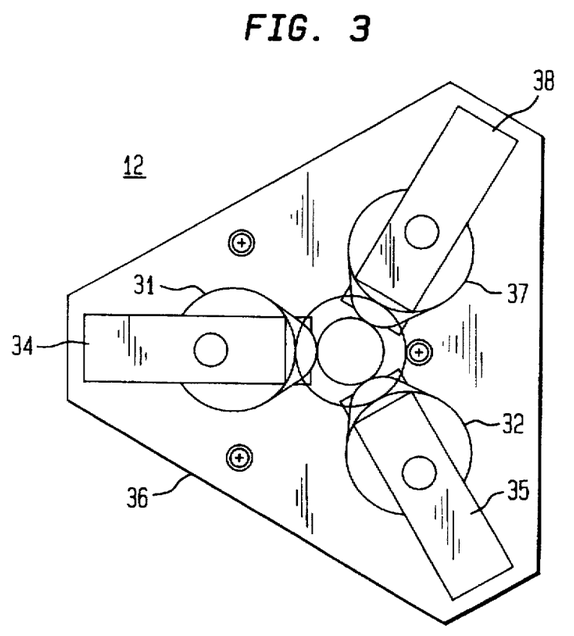
FIG. 3 is a top plan representation of the roller support arrangement of FIG. 2.

FIG. 3 is a top plan view of support roller arrangement 12. In this figure, elements of structuring bearing analogous correspondence to elements of structure described previously with respect to FIG. 2 are similarly designated. This figure shows that three roller supports 34, 35 and 38 are installed on base 36, and serve to maintain support rollers 31, 32 and 37 in fixed relation to one another.

Figure 4:
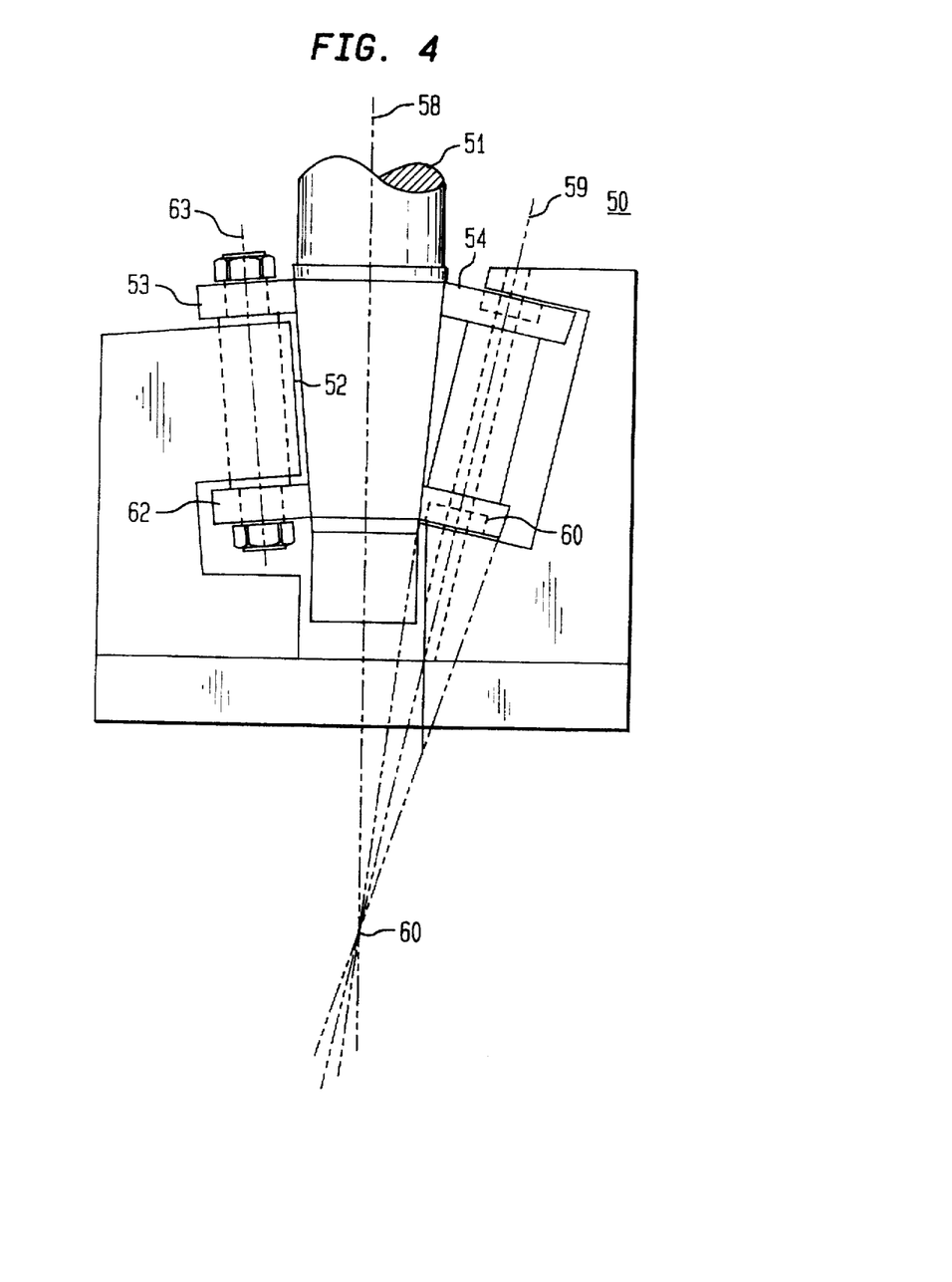
FIG. 4 is a schematic representation of a specific illustratively embodiment of the invention showing the axial relationship between the support rollers and the workpiece.

FIG. 4 is a schematic representation of a roller support arrangement 50 having a workpiece 51 with a conical surface 52 maintained in fixed relation between support rollers 53 and 54. Work piece 51 is arranged to rotate about a central axis 58 and roller 54 is arranged to rotate about a central axis 59. Axes 58 and 59 are shown to intersect one another at an intersection point 60 in this specific illustrative embodiment of the invention, support roller 54 and its coaxially related support roller 60 each have a conical surface configuration where they communicate with conical surface 52 of workpiece 51. On the other hand, support roller 53 and its coaxially related support roller 62 have a cylindrical configuration. Thus, a central axis 63 about which support rollers 53 and 62 rotate is substantially parallel to the conical surface of the workpiece. On the other hand, central axis 59, about which substantially support rollers 54 and 60 rotate is not parallel to conical surface 52 of the workpiece, but in this embodiment, the external surfaces of conical rollers 54 and 60 are parallel to conical surface 52.

Figure 5:
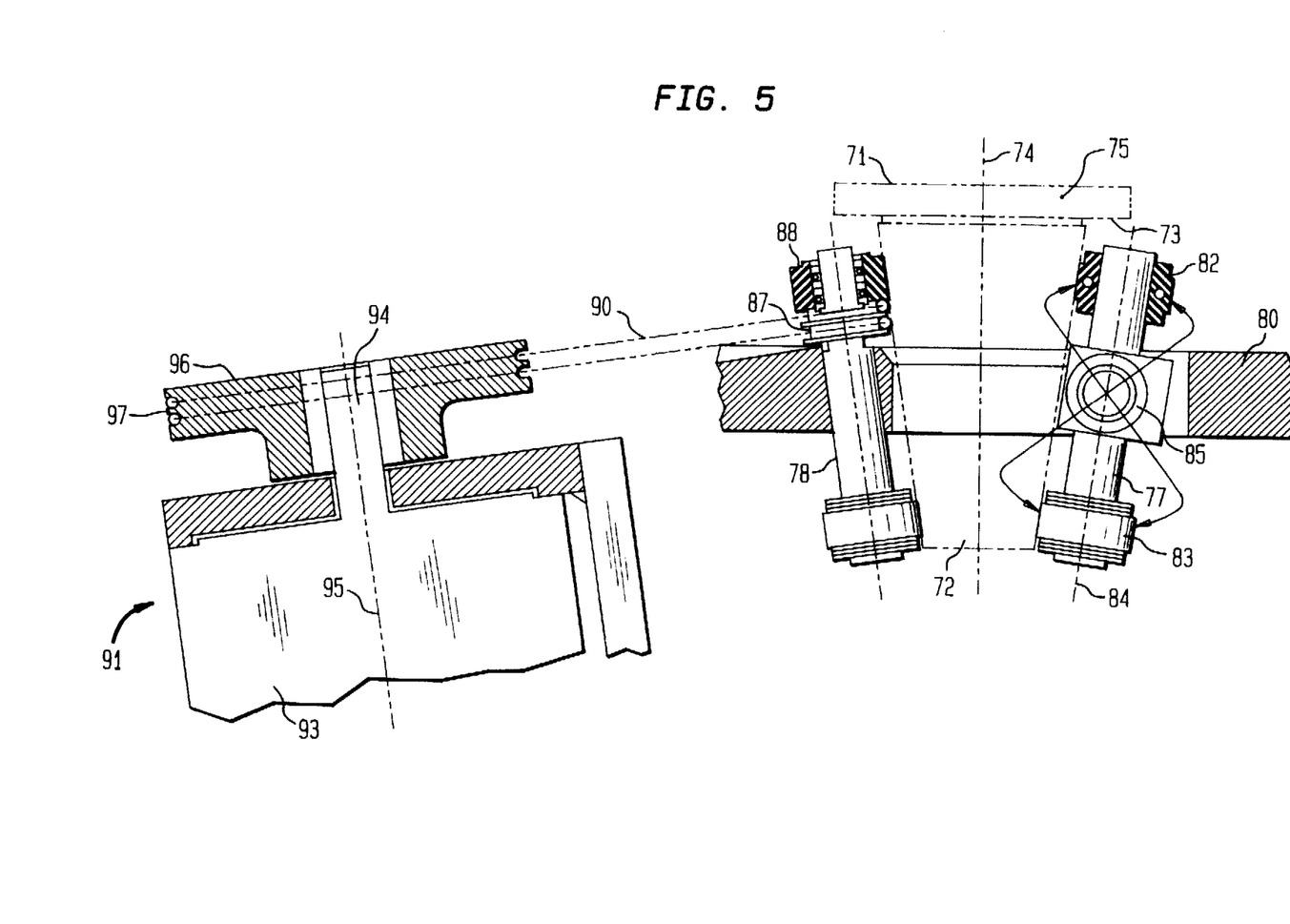
FIG. 5 is a partially cross-sectional representation of a roller support arrangement for supporting a conical workpiece, and further showing a drive arrangement.

FIG. 5 is a partially cross-sectional representation of a roller support arrangement for supporting a conical workpiece, and further showing a drive arrangement. In this specific illustrative embodiment of the invention, a roller support arrangement 70 is shown to support a workpiece 71 having a conical surface 72 and an annular surface 73, which is shown to be the underside of a flange portion 75. Workpiece 71 is arranged to rotate about an axis 74. The roller support arrangement has first and second roller support assemblies 77 and 78, respectively, which are fixed to a support deck 80, shown in fragmented form in this figure.

In the specific illustrative embodiment of the invention of FIG. 5, first roller support assembly 77 has rollers 82 and 83 installed thereon and arranged to be rotatable about a common axis 84 of rotation. Roller 82 is illustrated in cross-section to show the supporting bearings in this specific illustrative embodiment of the invention. Further, axis 84 of roller support assembly 77 can be rotated about a roller assembly pivot 85 to ensure good communication between rollers 82 and 83 and conical surface 72 of the workpiece. Thus, in embodiments of the invention where rollers 82 and 83 are of equal diameters, axis 85 will be pivoted until it is parallel to the conical surface of the workpiece.

Roller support assembly 78 is similar to roller support assembly 77, and is provided in this embodiment with a pulley 87 that is arranged coaxially with a roller 88. Pulley 87 is coupled via a flexible drive belt 90 to a drive motor assembly 91. The motor assembly is shown to have a drive motor 93 having a motor shaft 94 that is arranged to rotate about an axis 95 of rotation. A drive pulley 96 is installed on motor shaft 94 and has a peripheral edge 97 that in this specific illustrative embodiment of the invention is configured to accommodate flexible drive belt 90 therearound. In operation, a torque applied by the motor causes drive pulley 96 to be rotated. As a result of the transmission of the torque via flexible drive belt 90, pulley 87, which is coupled to rotate with roller 88, causes the roller to rotate. Consequently, the frictional communication between roller 88 and conical surface 72 of workpiece 71 causes the torque to be transmitted to the workpiece, whereupon the workpiece is rotated.

Figure 6:
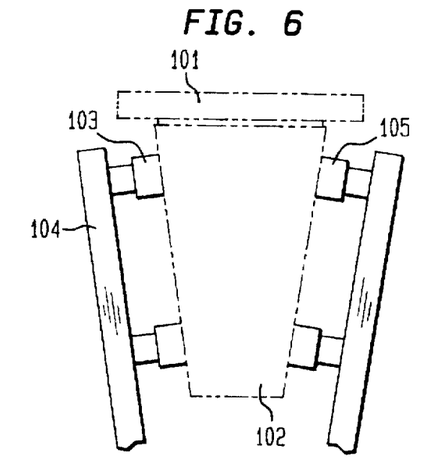
FIG. 6 is a schematic representation of a specific illustratively embodiment of the invention showing a non-rotating support arrangement.

FIG. 6 is a highly simplified schematic representation of a specific illustratively embodiment of the invention showing a non-rotating support arrangement 100. As shown, a workpiece 101 has a conical surface 102. In this specific illustrative embodiment of the invention, a non-rotating support element, such as a guide pad 103, is installed on a support 104 and communicates supportingly with conical surface 102 of the workpiece. In a further embodiment, the workpiece is rotatively supported by a non-rotating support element, such as an air bearing 105. Irrespective of the nature of the non-rotating support element, i.e., guide pad and/or air bearing, a drive arrangement, such as that described hereinabove with respect to FIG. 5, is to be employed.

Figure 7:
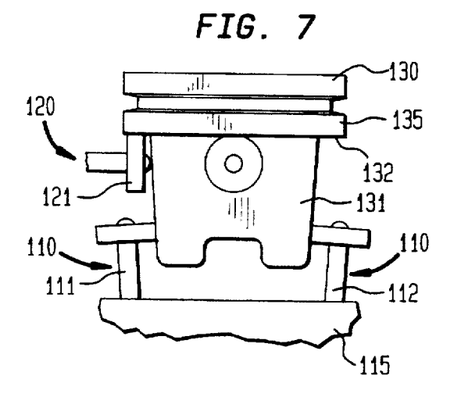
FIG. 7 is a schematic representation of a roller support arrangement for supporting a conical workpiece on conical and annular surfaces thereof, in accordance with the invention.
Figure 8:
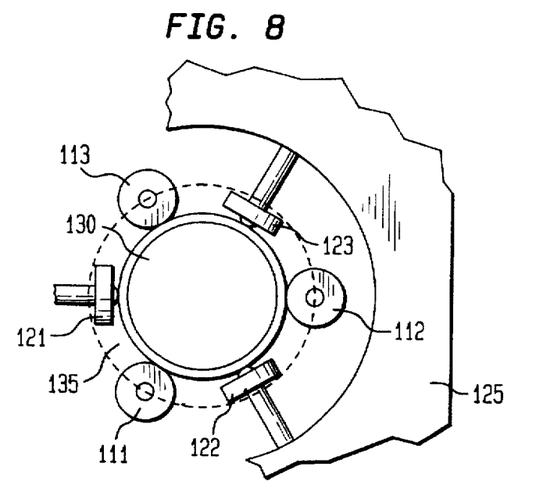
FIG. 8 is a schematic top plan view of the arrangement of FIG. 7.

FIG. 7 is a simplified schematic representation of a roller support arrangement for supporting a conical workpiece on conical and annular surfaces thereof, in accordance with the invention, and FIG. 8 is a schematic top plan view of the arrangement of FIG. 7. As shown in these figures, first and second roller support arrangements, identified generally in FIG. 7 as 110 and 120 respectively, cooperate to support a workpiece 130 having a conical surface 131 and an annular surface 132 which is shown to be the underside of a flange portion 135. First Roller support arrangement 110 is shown to have a plurality of roller support assemblies, only two of which, 111 and 112, are shown in FIG. 7, and a third associated roller assembly 113 is shown in FIG. 8. Roller assemblies 111, 112, and 113 are, in this specific illustrative embodiment of the invention, installed on a support deck 115.

Second roller arrangement 120 is provided with a further plurality of roller support assemblies, only one of which, 121 is shown in FIG. 7, and second and third associated roller assemblies 122 and 123 are shown in FIG. 8. Roller assemblies 121, 122, and 123 are, in this specific illustrative embodiment of the invention, installed on a further support deck 125 (not shown in FIG. 7). Persons of skill in the art can configure the application of a drive to the workpiece, illustratively by adaptation of a motor drive arrangement, as described above with respect to FIG. 5.

In the specific illustrative embodiment of the invention of FIGS. 7 and 8, the first and second roller support assemblies 110 and 120 have rollers associated therewith arranged to be rotatable about respective axes of rotation (not shown). The rollers are, in certain embodiments of the invention, configured as roller 82 in FIG. 5, which is shown to have supporting bearings. In addition, the orientation of the axes of rotation can be arranged to be adjustable to ensure good communication between the rollers and the conical surface of the workpiece.

Figure 9:
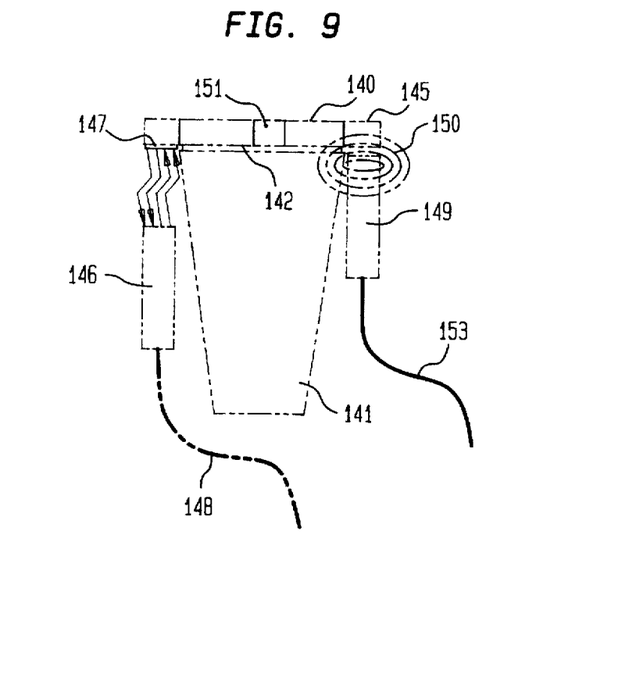
FIG. 9 is a schematic representation of arrangements for determining rotational phase reference points employed with a flanged conical workpiece.

FIG. 9 is a schematic representation of a several arrangements that can be used in the practice of the invention for determining rotational phase reference points of the workpiece, particularly a workpiece of the type having a conical surface and an annular, i.e., flanged surface, arranged at a predetermined angle with respect to the conical surface. As shown, a workpiece 140 having a conical surface 141 and an annular surface 142, which is shown to be the underside of a flange portion 145 is arranged to rotate about an axis of rotation (not shown), as previously described. The workpiece is supported by any of the previously described support arrangements. In one embodiment, a photodetector arrangement 146 is aimed to emit a beam of light, as indicated by the emission arrows, at annular surface 142 and receive a reflection therefrom, as indicated by the reflection arrows. Reflection is preferably achieved by a reflective portion of annular surface 142, which may include, in certain embodiments, a strip of reflective tape 147. The reflection causes a corresponding electrical signal to be produced at output lead 148.

In another embodiment of the invention, an RF pickup 149 emits an RF field 150 that includes within its flux the flange portion 145 of the workpiece. In this embodiment, annular surface 142 may have one or more notches, such as notch 151 that alter RF field 150, thereby causing the RF pickup to issue a corresponding electrical signal at output lead 153. Thus, output leads 148 and 153, each produces electrical signals, such as pulses, that coincide with a predetermined point, or angular position, of the workpiece as it is rotated.

Figure 10:
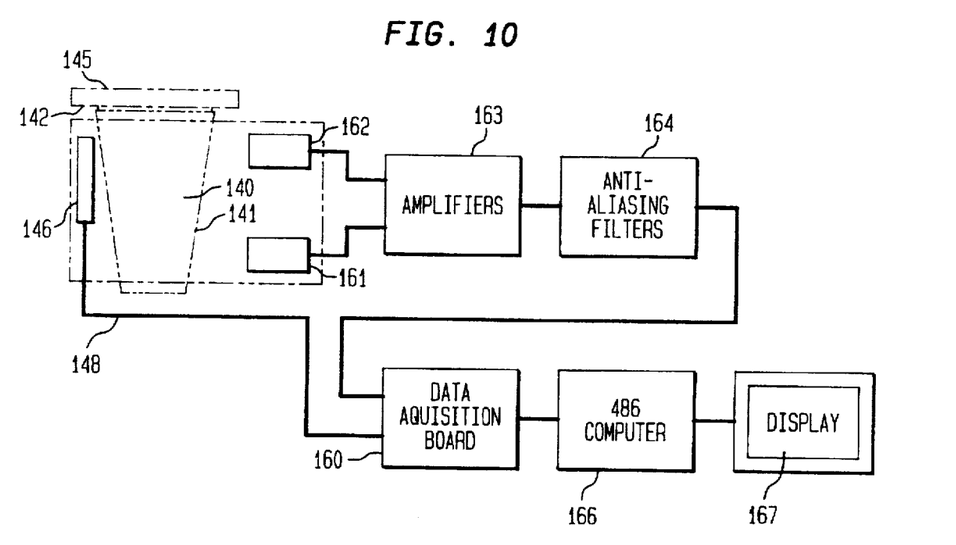
FIG. 10 is a highly simplified block diagram of an electronic system for determining the location and magnitude of a residual unbalance of a conical workpiece.

FIG. 10 is a highly simplified block diagram of an electronic system for determining the location and magnitude of a residual unbalance of a conical workpiece. Elements of structure that bear analogous correspondence to elements previously described are similarly designated. Thus, workpiece 140 with its conical surface 141 and annular surface 142, which is shown to be the underside of a flange portion 145 is arranged to rotate, as previously described. The workpiece is supported by any of the previously described support arrangements. In this embodiment, photodetector arrangement 146 is aimed to emit a beam of light, as previously described, at annular surface 142 and receive a reflection therefrom. Reflection is achieved, in this embodiment, by a strip of reflective tape (not shown in this figure). The reflection causes a corresponding electrical signal to be produced at output lead 148 which, as previously described, indicates a predeterminable phase point of the rotation of the workpiece. The phase signal on output lead 148 is conducted to a data acquisition board 160.

In this specific illustrative embodiment of the invention, two force transducers 161 and 162 are arranged to receive forces that result from an unbalance of the workpiece and which are particularly associated with respective planes of rotation of the workpiece, and also forces that derive from the rotation of unbalanced rotatory components of the support structure (not shown in this figure). The resulting composite force signals are conducted to amplifiers 163. After amplification, the composite force signals are conducted to an anti-aliasing filter arrangement 164 where high frequency signal components that would cause error in the amplitude values of the lower frequency signal components of interest are removed. An illustrative source of the undesired high frequency signal components results from the frictionally communicating surfaces of the rollers and the workpiece (not shown in this figure), which surfaces generally are not ideally smooth. The remaining force signal frequency components that have not been removed by the anti-aliasing filters are conducted to a data acquisition board 160. A computer, such as a 486 computer 166, receives the output signal of the data acquisition board and correlates the force and phase signals associated with the workpiece. A significant function of computer 166 is to process the composite force signals received from the data acquisition board and to isolate therefrom the force signals associated with the planes of rotation of interest of the workpiece. As previously noted, the composite force signal contains force signal components associated with the various mechanical components of the support structure. Since the rollers in the support structure are arranged to rotate at a rate that is different from that of the workpiece, their contributions to the composite force signal can be identified by their frequencies. The computer additionally causes a display 167 to present to a user (not shown) of the system information relating to the magnitude and angular location of the residual unbalance, the angular location being referenced to the phase signal produced by photodetector arrangement 146.

Figure 11:
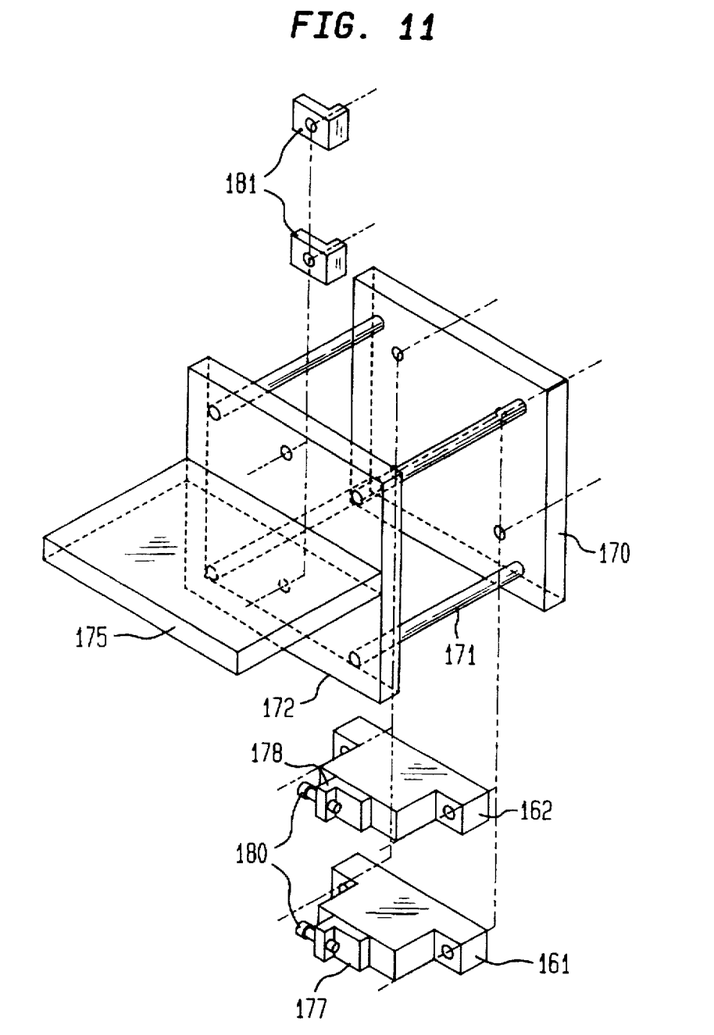
FIG. 11 is a schematic, exploded representation of a suspension arrangement for providing unbalance force signals in two planes of measurement.

Also in the specific illustrative embodiment of the invention shown in FIG. 10, the workpiece, the support arrangement (not shown), the photodetector arrangement, and the force transducers are installed on a suspension system 168 that is indicated schematically by a box formed of dashed lines. FIG. 11 is a schematic, exploded representation of a suspension arrangement for providing unbalance force signals in two planes of measurement without the need of transducers communicating directly with the workpiece. As shown, a base 170 has, in this embodiment, four support rods 171 coupled thereto and extending transversely outward. A suspended support element 172, which in this embodiment is generally planar, is coupled to the support rods at their distal ends. Support rods 171 are resilient and have a leaf-spring-like characteristic wherein a resilient biasing force is provided to return suspended support element 172 to its original position with respect to base 170. More specifically, the support rods resiliently resist displacement of suspended support element 172 in a plane parallel to its general plane. The suspended support element is coupled to deck 175, upon which, the workpiece, (not shown) the support arrangement (not shown), and the photodetector arrangement (not shown) are installed.

Transducer force blocks 161 and 162, discussed functionally and illustrated schematically hereinabove with respect to FIG. 10, are shown in FIG. 11 to be installed securely on base 170. Each of the transducer force blocks has a respectively associated one of connecting brackets 177 and 178 installed thereon. Also, each such connecting bracket has an associated force transmitting tip 180 coupled thereto, where the force to be monitored is sensed. Tips 180 may, in certain embodiments, be in the form of set screws to facilitate adjustment of their respective extensions beyond their associated connecting brackets, as needed. A pair of force transmitters 181 are securely coupled to suspended support element 172 and are resiliently urged, by operation of the resilient characteristic of support rods 171, against transducer tips 180. That is, support rods 171 resiliently urge force transmitters 181 into communication with the transducer tips. Thus, as deck 175 is excited by the residual unbalance of the rotating workpiece (not shown in this figure) and the support arrangement (also not shown in this figure), the force transmissions, corresponding to the unbalance forces, are conducted to suspended support element 172, and through force transmitters 181 to the transducer tips, whereupon a corresponding force signal is generated, as previously described, by transducer force blocks 161 and 162. Significant advantages, including enhanced precision of measurement, are achieved by the conduction of the forces as described without inducing vibrational displacement of any of the system components.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An apparatus for determining the location and magnitude of residual unbalance of a workpiece having an engagement portion of the type characterized by a substantially conical surface, the substantially conical surface defining a predetermined included characteristic angle with respect to a workpiece axis of rotation, the apparatus comprising:

support means formed of a plurality of rotatory support elements for supporting the workpiece rotatively, each rotatory support element having a respectively associated rotatory element axis of rotation, said rotatory element axes of rotation of said rotatory support elements being arranged to intersect one another, each rotatory support element being arranged to communicate with the substantially conical surface of the engagement portion of the workpiece and to rotate at a different rate of rotation than a rate of rotation of the workpiece;

transducer means for producing a multicomponent unbalance signal responsive to the residual unbalance of the workpiece and a residual unbalance of said workpiece support means; and means for determining a reference position of the workpiece.

2. The apparatus of claim 1, wherein said support means further comprises support adjustment means for enhancing the communication between said support means and the workpiece.

3. The apparatus of claim 2, wherein said support adjustment means comprises means for reorienting a selected one of said rotatory element axes of rotation.

4. The apparatus of claim 3, wherein said means for reorienting comprises pivot means for varying an angle formed between said selected one of said rotatory element axes of rotation and the workpiece axis of rotation.

5. The apparatus of claim 1 wherein the substantially conical surface of the workpiece is an external surface.

* * * * *